United States Patent
Bustos Robledo

(10) Patent No.: US 8,636,878 B2
(45) Date of Patent: Jan. 28, 2014

(54) ALTERNATING ELECTRIC CURRENT GENERATING PROCESS

(75) Inventor: Juan Pablo Bustos Robledo, Santiago (CL)

(73) Assignee: Hecker Electronics de Potencia y Procesos S.A., Santiago (CL)

( * ) Notice: Subject to any disclaimer, the term of this patent is extended or adjusted under 35 U.S.C. 154(b) by 1 day.

(21) Appl. No.: 13/188,154

(22) Filed: Jul. 21, 2011

(65) Prior Publication Data

US 2012/0018297 A1      Jan. 26, 2012

Related U.S. Application Data

(62) Division of application No. 12/058,346, filed on Mar. 28, 2008.

(30) Foreign Application Priority Data

Mar. 28, 2007    (CL) .................................... 817-2007

(51) Int. Cl.
C25C 3/20    (2006.01)

(52) U.S. Cl.
USPC ................... 204/230.2; 204/230.5; 204/230.8

(58) Field of Classification Search
USPC ................................ 204/230.2, 230.5, 230.8
See application file for complete search history.

(56) References Cited

U.S. PATENT DOCUMENTS

| | | | | |
|---|---|---|---|---|
| 2,026,466 | A * | 12/1935 | Grolee | 204/228.1 |
| 2004/0211677 | A1 * | 10/2004 | Lewis | 205/725 |
| 2007/0272546 | A1 * | 11/2007 | Matthews | 204/230.2 |

* cited by examiner

Primary Examiner — Nicholas A Smith
(74) Attorney, Agent, or Firm — Husch Blackwell LLP

(57) ABSTRACT

This is a device and process to generate alternating current without an external source for cell-houses in electro-winning or electro-refining of copper or other products in which the electric source consists of a conventional rectifier-transformer group that supplies continuous electrical current to the cell-house, which is connected in parallel to a device characterized by having the capacity to extract an electrical current from the cell-house for a period of time and then return it in another period of time, whether periodically or semi-periodically and without changing the average value of the electrical current, supplied to the cell-house by the rectifier-transformer. This results in an electrical current in the cell-house that is the superimposition of a continuous and alternating current. This process is designed to overcome the barrier of electric potential produced by the presence of the pure continuous electric field in cell-houses through the electric agitation of an ion-rich electrolyte.

8 Claims, 2 Drawing Sheets

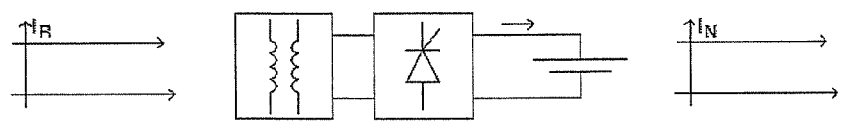
Fig. Nº1
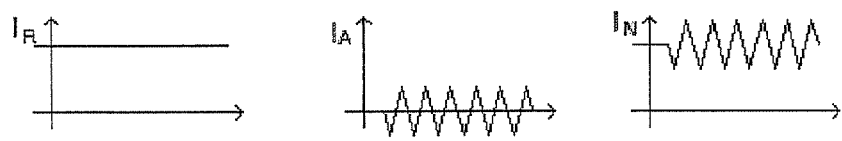
Fig. Nº2
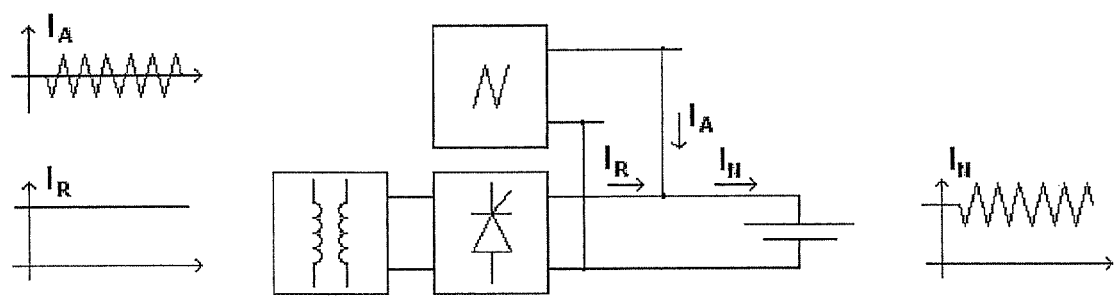
Fig. Nº3

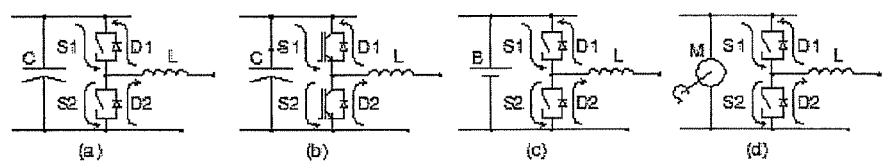
Fig. Nº4
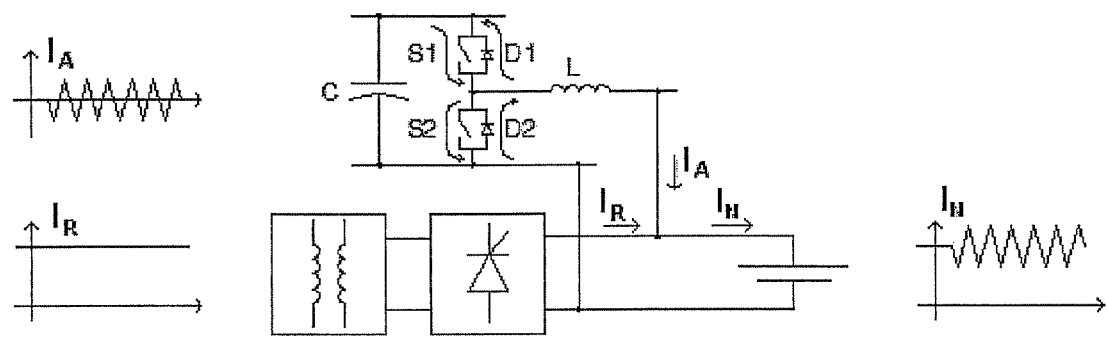
Fig. Nº5

ALTERNATING ELECTRIC CURRENT GENERATING PROCESS

CROSS-REFERENCE TO RELATED APPLICATIONS

This application is a Divisional of and claims the benefit of the filing date of U.S. application Ser. No. 12/058,346 filed Mar. 28, 2008, which claims the benefit of the filing date of CL No. 817-2007 filed Mar. 28, 2007.

TECHNICAL PROBLEM

In the copper industry, transformer-rectifiers are used to produce copper which is dissolved in circulating electrolyte (FIG. 1) in electrolytic plants. The transformer-rectifier produces electrical current which, according to Faraday's Law, produces the electro deposition of the cooper dissolved in the solution on the cathode that later is harvested obtaining as a result metallic copper of high purity. The level at which it is deposited is proportional to the intensity of the current that circulates. Nevertheless, the previous process presents restrictions in the capacity to deposit copper in the cathode, due to the presence of electric field in the electrolyte (rich in copper ions) that polarizes the space between the anode and the cathode, taking place a potential barrier that limits deposited copper. Nowadays, it is used current densities of the order of 300 to 400 $[A/m^2]$. If the level of current (or electric field) increases, benefit in the production is not obtained.

Nevertheless, it is possible to produce electrical agitation in the electrolyte by means of the variation of the current level, obtaining homogenization of the electrolyte in the proximity of the cathode. Therefore, it is obtained an improvement in the deposition of copper into the electrolytic plant.

The technology of Electro winning (EW) and Electro refining (ER) is also used to produce other metals and in other productive processes.

The technical problem is how to implement the process to generate current composed by the direct component and alternating component for EW and ER in electrolytic processes.

PROPOSED SOLUTION

The new source for electrolytic processes (EW and ER) must produce the required deposition current, and additionally, the alternating current of superposed agitation (FIG. 2). The proposal consists of dividing the source into two independent sources of current connected in parallel with the electrolytic load:
1. A source of current capable of producing direct current for electro deposition.
2. A source of current capable of generating alternating current in the electrolytic load (FIG. 3).

BRIEF DESCRIPTION OF THE DRAWINGS

FIG. 1: Situation in which the process of electro winning or electro refining of copper and other products is developed: the current of the rectifier is continuous and equal to the current that enters the electrolytic load. The source of direct current is a transformer-rectifier.

FIG. 2: A future situation in which it will be developed the process of electro winning or electro refining of copper and other products once implemented the process of generation of alternating current: the current of the rectifier is continuous. The alternating current has null average value. The current which enters the electrolytic plant has the same average value to the current generated by the source of DC and a superposed alternating component.

FIG. 3: Wiring diagram between the source of DC, the device of generation of alternating current and the electrolytic plant in the future situation, once implemented the process of generation of alternating current.

FIG. 4: Alternatives of implementation of elemental alternating current generator devices: (a) Implementation with electrical switches. (b) Implementation with transistors. (c) Implementation with electrochemical accumulation. (d) Implementation with rotating machines accumulation.

FIG. 5: Wiring diagram between the source of DC, the alternating current generation device and the electrolytic load in the future situation, once implemented the process of generation of alternating current.

DESCRIPTION OF THE PROCESS OF GENERATION OF ALTERNATING CURRENT

The process of generation of alternating current which is claimed in this document consists of the following three (3) stages: subtraction stage, the accumulation stage and return stage.

Subtraction Stage

The subtraction stage consists of removing the current and/or energy from the electrolytic load, during a period of time.

Accumulation Stage

The accumulation stage consists of accumulating, in a suitable deposit, the energy removed from the ship during a period of time.

Return Stage

The return stage consists of putting back the current and/or energy accumulated in the deposit towards the electrolytic ship, during a period of time.

Description of the Device Generator of Alternating Current

The device generator of alternating current can be constituted by electronic switches, diodes, capacitors and inductors, conforming a capacitor bank in parallel with a semi-bridge of electronic switches with anti-parallel diodes connected to the electrolytic load by means of an inductor (and a capacitor as required).

The detailed description of the process of generation of alternating current can be done describing the device operation.

In its simpler form (see FIGS. 4 and 5), the device subtracts current and accumulates energy from the electrolytic load in the following way:
1. The S2 switch (parallel-to-load electronic switch) is closed causing a controlled short circuit and accumulating energy in inductor L.
2. The S2 switch is opened and the current in inductor L continues circulating around the D1 diode (not-parallel-to-load diode) giving the accumulated energy in inductor L to capacitor C, for its accumulation.
3. The cycle of turning on and turning off of the S2 gate is repeated indefinitely until the level of current and energy (subtracted and accumulated) reaches the wished level.

The device, in its simpler form, accumulates energy in the bank of capacitors, being able to be connected to an auxiliary device to increase the capacity of energy accumulation.

The device, in its simpler form, returns current and accumulated energy to the electrolytic load in the following way:
1. The S1 switch (not-parallel-to-load electronic switch) is closed causing a controlled short circuit and circulation of current through inductor L, returning the accumulated energy in capacitor C to the electrolytic load.

2. The S1 switch is opened and the current in inductor L continues circulating around the D2 diode (parallel-to-load diode) returning the energy accumulated in inductor L to the electrolytic load.

3. The turn on and turn off cycle of S1 gate is repeated indefinitely until the level of current and returned energy reaches the wished level.

The general operation of the equipment is characterized by successive cycles of subtraction, accumulation and return of current and energy from and towards the electrolytic load.

Although the process causes alternating electrical current of null average value and transference of energy of null average value, the capacitor is required because the subtraction and return occurs at different periods of time Technical Aspects of the Design of Processes and Devices Due to operational reasons, like changes in the density of electrolyte, temperature of the electrolyte, in the type of material to be produced, etc; the operator of the electrolytic plant will be able to modify the alternating current wave pattern introduced in the electrolytic load. In order to design a device that is able to work in typical electrolytic loads and carry out adjustments of frequency and intensity of alternating current in the electrolytic load, the following must be considered:

1. Typical levels of current in electrolytic plants are normally higher than practically any other type of industrial process; therefore, the design of devices will normally be on the basis of multiple connected elementary devices in parallel. The higher alternating current obtained will depend on the design of the device.

2. The maximum frequency generated for this process depends on mechanical characteristics and physical extension of the electrolytic plant. This is because of the existence of inductance and parasitic capacities of non despicable values.

3. The minimum frequency will depend on the interference that the operation of the device will cause in the operation of the source of direct current that feeds the electrolytic plant.

4. The operation of the current generator device to different frequencies can be obtained by means of the coordinated operation of multiple elementary devices in multiple stages of subtraction, accumulation and return of energy and current.

5. After having the source of direct current and the source of alternating current working, it is possible to increase the direct current to the electrolytic plant and to increase the harvest proportionally.

The proposed solution is better than making "traditional chopper rectifiers", because in a chopper rectifier, the current of high alternate frequency must circulate around chopper and, in addition, the average value of the added current must circulate to increase the production of the electrolytic plant. This is expensive from the point of view of investment and it is inefficient from the point of view of power.

The elements that conform the device and its topologic configuration are profusely used in the manufacture of voltage commutated converters like drivers for controlling motors (speed controllers), nevertheless, their use in the process that is claimed in this document differs in the fact that the bank of capacitors is not connected to any power source (typically a rectifier) nor to any element of absorption or dissipation (typically units of dynamic braking), since it has the only function of accumulation of the subtracted energy and that it will be returned to the electrolytic load later. In addition, with its use, a process problem without a former equivalent solution is solved.

The fact that the components that conform the device generator are of common use guarantee the implementation of the process.

The invention claimed is:

1. A device to generate an alternating current and to provide an electrical current to an electrowinning or electrorefining load, the device comprising: a direct component that provides a direct current to the load; and an alternating component that generates the alternating current and provides the alternating current to the load, wherein the direct component and the alternating component are connected in parallel with the load, wherein the alternating component generates the alternating current by subtracting a portion of the electrical current from the load during a first period of time, by accumulating the subtracted electrical current in the alternating component during a second period of time, by returning the accumulated electrical current to the load during a third period of time, and by repeating the subtracting, accumulating, and returning periodically or semi-periodically to produce and provide the electrical current to the load without changing an average value of the direct current from the direct component, and wherein the electrical current to the load is equal to a sum of the direct current from the direct component and the alternating component from the alternating component.

2. The device as in claim 1 wherein the alternating component includes a capacitor bank in parallel with a half-bridge of switches with diodes connected to the load.

3. The device as in claim 2 wherein the capacitor bank includes at least two electronic switches, two diodes, one capacitor, and one inductor.

4. The device as in claim 2 wherein the capacitor bank accumulates the subtracted electrical energy during the second period of time.

5. The device as in claim 1 wherein the alternating component includes a parallel-to-load switch and an inductor, and wherein closing the parallel-to-load switch causes a short circuit and energy to accumulate in the inductor.

6. The device as in claim 5 wherein the alternating component includes a not-parallel-to-load diode and a capacitor, and wherein opening the parallel-to-load switch causes the energy accumulated in the inductor to flow around the not-parallel-to-load diode and accumulate in the capacitor.

7. The device as in claim 6 wherein the alternating component includes a not-parallel-to-load switch, and wherein closing the not-parallel-to-load switch causes a short circuit and energy to accumulate in the inductor, returning the energy accumulated in the capacitor to the load.

8. The device as in claim 7 wherein the alternating component includes a parallel-to-load diode, and wherein opening the not-parallel-to-load switch causes the energy accumulated in the inductor to flow around the parallel-to-load diode, returning the energy accumulated in the inductor to the load.

* * * * *